United States Patent
Hahn et al.

(10) Patent No.: US 7,145,604 B2
(45) Date of Patent: Dec. 5, 2006

(54) METHOD AND DEVICE FOR DETERMINING THE SPACING BETWEEN A FIRST AND A SECOND SIGNAL SEQUENCE

(75) Inventors: Marko Hahn, Neubiberg (DE); Peter Rieder, Munich (DE)

(73) Assignee: Micronas GmbH, Freiburg (DE)

( * ) Notice: Subject to any disclaimer, the term of this patent is extended or adjusted under 35 U.S.C. 154(b) by 340 days.

(21) Appl. No.: 10/832,475

(22) Filed: Apr. 26, 2004

(65) Prior Publication Data

US 2005/0036072 A1    Feb. 17, 2005

(30) Foreign Application Priority Data

Apr. 24, 2003   (DE) ............... 103 18 620

(51) Int. Cl.
*H04N 7/01* (2006.01)
(52) U.S. Cl. .................................... 348/452
(58) Field of Classification Search ........... 348/452, 348/441, 448, 413.1; 382/107, 100, 239, 382/236
See application file for complete search history.

(56) References Cited

U.S. PATENT DOCUMENTS

| | | | | |
|---|---|---|---|---|
| 4,621,290 A | | 11/1986 | Fling | 358/166 |
| 5,027,201 A | * | 6/1991 | Bernard | 348/702 |
| 5,031,042 A | | 7/1991 | Rabii | 358/167 |
| 5,172,226 A | | 12/1992 | Morimura et al. | 358/105 |
| 5,444,493 A | * | 8/1995 | Boie | 348/448 |
| 5,943,099 A | * | 8/1999 | Kim | 348/448 |
| 6,239,842 B1 | * | 5/2001 | Segman | 348/448 |
| 6,418,233 B1 | * | 7/2002 | Kondo et al. | 382/107 |
| 6,459,455 B1 | | 10/2002 | Jiang et al. | 348/452 |

(Continued)

FOREIGN PATENT DOCUMENTS

GB    2358309    7/2001

(Continued)

OTHER PUBLICATIONS

Haan et al. "Deinterlacing an Overview" Proceedings of the IEEE, ILLL. New York, US, vol. 86, No. 9, Sep. 1998 pp. 1839-1857, XP000850198 ISSN:0018-9219.

(Continued)

*Primary Examiner*—Paulos M. Natnael
(74) *Attorney, Agent, or Firm*—O'Shea, Getz & Kosakowski, P.C.

(57) ABSTRACT

In a method and device for determining the spacing between first and second sequences of signal values, first and second successive signal values of the first sequence have assigned thereto a third signal value of the second sequence, the third signal value being located temporally or spatially between the first and second signal values of the first sequence. A first spacing value is determined based on a mixing value from the first and second signal values, a second spacing value between the mixing value and the third signal value, an interval width value based on the width of an interval defined by the first and second signal values, and mapping of the second spacing value onto the first spacing value using the interval width value such that a mapping curve has at least two segments with different slopes, where the slope of the curve, at least in segments, is shallower for second spacing values smaller than the interval width value than for second spacing values larger than the interval width value, and such that for at least one second spacing value smaller than the interval width value, the resulting first spacing value is smaller than this second value. A plurality of first spacing values are determined, and then added to determine the spacing between the two signal sequences.

20 Claims, 4 Drawing Sheets

U.S. PATENT DOCUMENTS

2003/0011709 A1    1/2003    Kasahara et al. ........... 348/452

FOREIGN PATENT DOCUMENTS

| WO | WO 85/04542 | 10/1985 | |
|---|---|---|---|
| WO | WO 99/16251 | 4/1999 | |
| WO | WO 00/27109 | 5/2000 | ...................... 5/14 |

OTHER PUBLICATIONS

Schröder et al., "Mehrdimensionale Signalverarbeitung", B.G. Teubner, 2000.

* cited by examiner

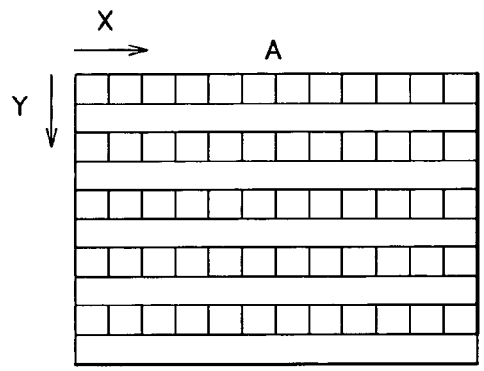
FIG. 1A
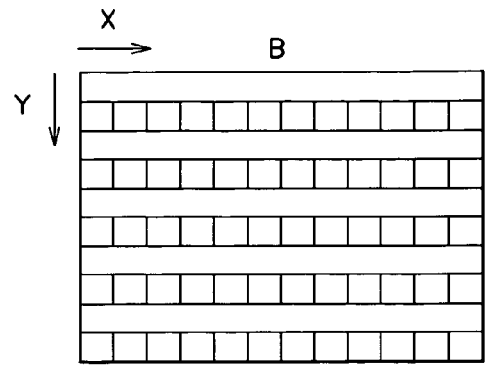
FIG. 1B
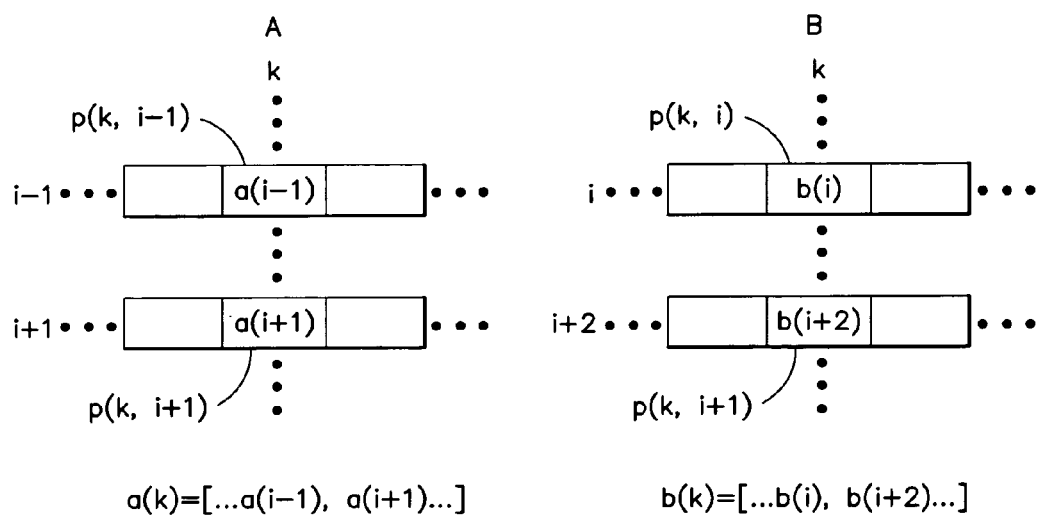
FIG. 2A          FIG. 2B

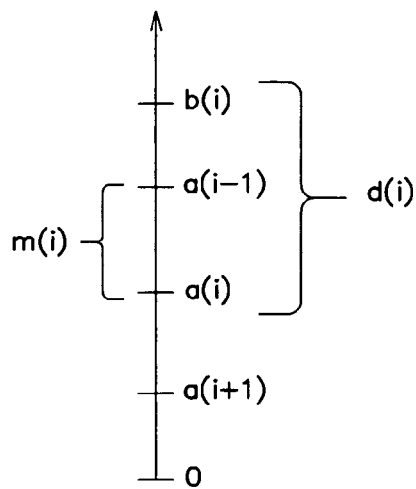 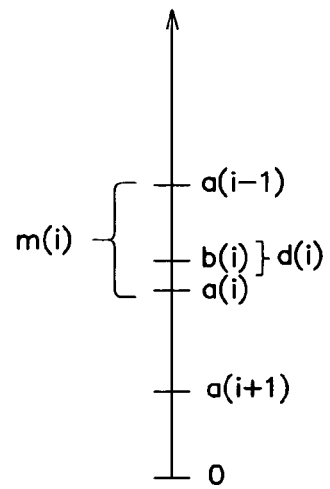
FIG. 3A   FIG. 3B
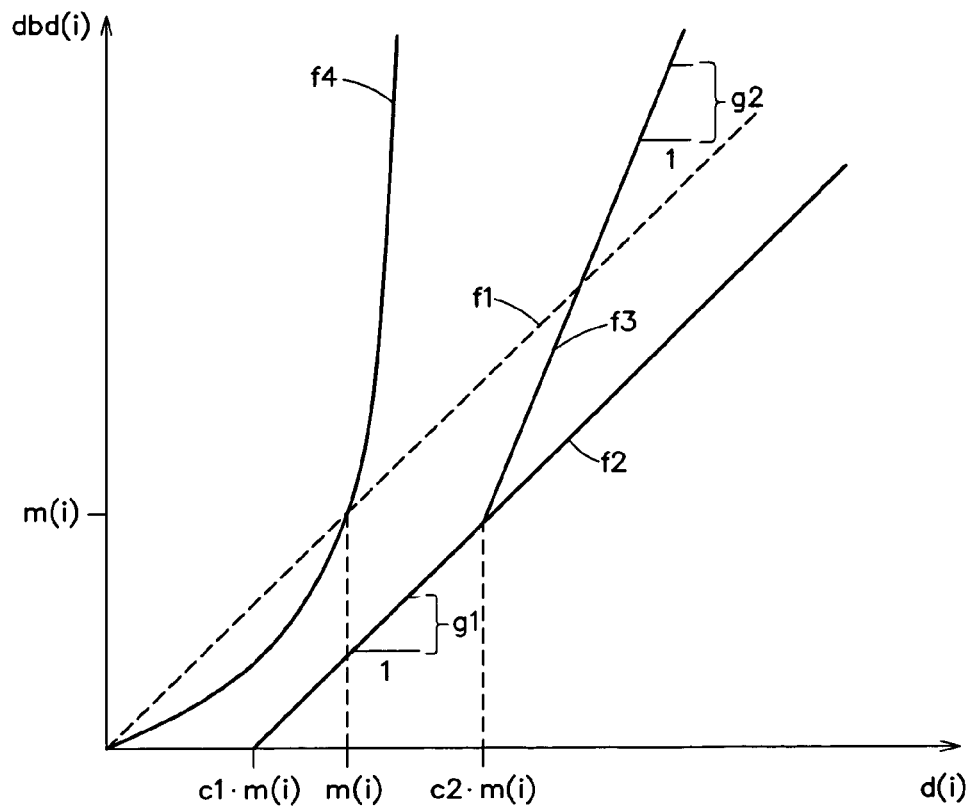
FIG. 4

METHOD AND DEVICE FOR DETERMINING THE SPACING BETWEEN A FIRST AND A SECOND SIGNAL SEQUENCE

BACKGROUND OF THE INVENTION

The invention relates to video image processing, and in particular to a method and device for determining the spacing between video signal values.

First and second sequences of video signals are obtained, for example, in video image processing, when the image information, in the form of pixels, of two temporally sequential fields with offset raster positions and built up line-by-line are read column-by-column. The first sequence of video signals relates to the image information in the first field, while the second sequence of video signals relates to the image information in the second field. Fields of this type include, for example, interlaced television pictures at a frequency of 50 Hz/60 Hz. Determination of the spacing between the two signal sequences is necessary, for example, to determine whether, or by what degree, two successive images or image segments of an image sequence differ. This information is required, for example, to determine whether the image sequence is displaying a still image or a moving image sequence. Depending on the result, it is then possible, for example, to select the appropriate algorithms (e.g., interpolation algorithms) to generate intermediate images.

Due to the difference in raster positions, the two interlaced fields cannot be compared pixel for pixel, nor can the two signal sequences be compared signal value by signal value. The inherent problem with interlaced fields is that for the pixel positions to which image information values are assigned in the first field, there are no corresponding pixels and thus no image information values in the second field. The two interlaced fields are complementary.

In response, for each of the two successive signal values of a first signal sequence obtained through column-by-column reading of a first field, a signal value is assigned from a second signal sequence obtained through column-by-column reading of a second field. The signal value of the second sequence is temporally or spatially assigned to the two signal values of the first signal sequence by the fact that this value is associated with a pixel position that is located between the pixel positions of the associated two signal values of the first sequence.

A known approach to comparing images/image segments of the type having different raster positions is to first perform a pixel interpolation procedure that assigns to each pixel of the first field a corresponding pixel in the second field. A comparison procedure can be implemented after each pixel of a first image has been assigned a pixel at the corresponding position in the second image. The two images are compared pixel by pixel, and the quantities of the differences for the image information values assigned to the individual pixels are added up.

The quality of the spacing determination depends to a significant degree on the quality of the interpolation procedure, and interpolation procedures which perform a reliable pixel interpolation are complex in their implementation.

Other signal sequences in which one signal value of a second signal sequence is assigned to two signal values within a first signal sequence include, for example, measurement series generated by regular measurement of a physical parameter. Therein, the measurement times of the two series are temporally offset with the result that a measured value of the first series is always recorded temporally between two measured values of the second series, and vice versa. For these signal sequences as well, it is desirable to determine their spacing without the necessity of previously generating interpolated intermediate values for the two series using a complex interpolation procedure.

What is needed is an effective method and device for determining the spacing between two signal sequences that define images having different raster positions, and which does not require a complex interpolation procedure.

SUMMARY OF THE INVENTION

In a method for determining a spacing between a first sequence of signal values and a second sequence of signal values, first and second successive signal values of the first sequence have assigned thereto a third signal value of the second sequence, the third signal value being located temporally or spatially between the first and second signal values of the first sequence. The method may determine a first spacing value based on the following steps:

a) determining a mixing value from the first and second signal values by weighting these signal values;

b) determining a mathematical spacing between the mixing value and the third signal value to determine a second spacing value;

c) determining an interval width value based on the width of an interval defined by the first and second signal values; and d) mapping the second spacing value onto the first spacing value using the interval width value as the mapping parameter such that a mapping curve by which the second spacing value is mapped onto the first spacing value has at least two segments with different slopes, where the slope of the curve, at least in segments, is shallower for second spacing values smaller than the interval width value than for second spacing values larger than the interval width value; and such that for at least one second spacing value smaller than the interval width value, the resulting first spacing value is smaller than this second value.

A device for determining spacing between a first sequence of signal values and a second sequence of signal values may include the following:

a mixer that generates a mixing value from a first signal value and a second signal value, which follow in succession in the first signal sequence, by weighting these signal values;

a spacing determination unit, provided with the mixing value and a third signal value of the second sequence, the third signal value being temporally or spatially assigned to the first and second signal values, the spacing determination unit determining a mathematical spacing between the mixing value and the third signal value to determine a second spacing value;

an interval determination unit, which determines the width of an interval defined by the first and second signal values, and provides an interval width value therefrom; and a mapping unit, which maps the second spacing value onto the first spacing value using the interval width value as the mapping parameter such that a mapping curve by which the second spacing value is mapped onto the first spacing value has at least two segments with different slopes, where the slope of the curve, at least in segments, is shallower for second spacing values smaller than the interval width value than for second spacing values larger than the interval width value; and such that for at least one second spacing value smaller than the interval width value, the resulting first spacing value is smaller than this second value.

A plurality of first spacing values are determined, each based on two successive and adjacent first and second signal values of the first signal sequence as one moves sequentially through the first sequence, and on the temporally or spatially assigned third signal value of the second signal sequence as one moves sequentially through the second sequence. The determined plurality of first spacing values are then linked (i.e., added) to determine the spacing between the two signal sequences.

The weighting of the first and second signal values during the generation of the mixing value may be dependent on the temporal or spatial position of the third signal value relative to the first and second signal values. When the third signal value is located temporally or spatially at the center between the first and second signal values, the mixing value is generated as the mean value of the first and second signal values, although it is also possible to generate the mean value as the mixing value for other temporal or spatial positions of the third signal value. The mixing value may be determined as a function of the temporal or spatial position of the third signal value relative to the position of the first and second signal values. For example, the first signal value may be weighted more strongly as compared with the second signal value when the first signal value is located temporally or spatially closer to the third signal value than is the second signal value. Corresponding mixing values apply for other positions of these three signal values relative to each other.

The interval width value may be chosen so that it corresponds to half the interval width of the interval defined by the first and second signal values.

These and other objects, features and advantages of the present invention will become more apparent in light of the following detailed description of preferred embodiments thereof, as illustrated in the accompanying drawings.

BRIEF DESCRIPTION OF THE DRAWING

FIGS. 1A and 1B illustrate image segments of two successive fields offset relative to each other;

FIGS. 2A and 2B are detailed portions of the fields of FIGS. 1A and 1B, respectively, illustrating the positions of pixels of each field relative to each other;

FIGS. 3A and 3B illustrate two different relationships of a pixel of the second field with respect to two pixels of the first field;

FIG. 4 illustrates signal characteristic curves of different functions for mapping a second spacing value onto a first spacing value;

DETAILED DESCRIPTION OF THE INVENTION

Figure 5:
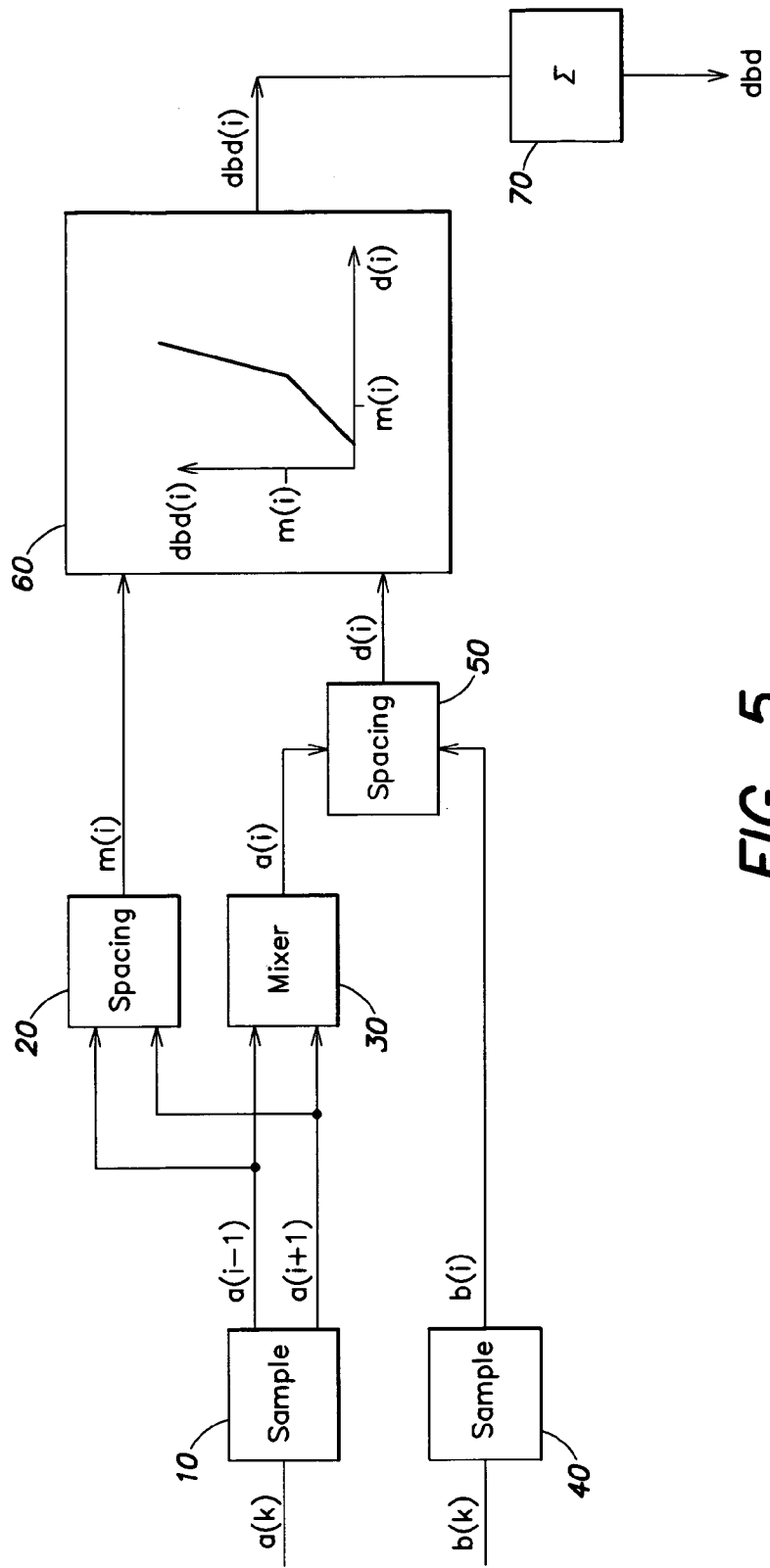
FIG. 5 is a block diagram of a first embodiment of a device for determining the spacing between a first signal sequence and a second signal sequence.

Except as otherwise stated, like reference characters in the drawings identify like parts with like meaning. The method and device for determining the spacing between two signal sequences are based on a first signal sequence and a second signal sequence, each sequence being generated by a column-by-column reading of the image information values of interlaced first and second fields. However, the method and device are not restricted to signal sequences for images, but may also be applied to any signals for which the signal values are temporally or spatially offset relative to each other.

Referring to FIGS. 1A and 1B, there illustrated are image segments from two successive interlaced fields A, B, in which image information values are assigned only to the pixels in every other (second) line. Further, the lines with image information values in the two fields are offset relative to each other, as illustrated in FIGS. 1A and 1B. The pixels of the lines having image information values are illustrated as having boxes, while the lines containing no pixels, and thus no image information values, are illustrated as empty lines.

When the displayed fields A, B, are each read line-by-line, a signal sequence is obtained for each column in each of the two fields. Thus, essentially each of the displayed fields A, B, in FIGS. 1A and 1B, respectively, is being read column-by-column and a resulting signal sequence is generated for each column that is read. Herein, a first signal sequence refers to the reading of a column in FIG. 1A, while a second signal sequence refers to the reading of a column in FIG. 1B. Further, the discussion herein is premised on the fact that a signal value of the second signal sequence is temporally or spatially assigned to two successive signal values of the first signal sequence, or vice versa, and that the pixel belonging to the signal value of the second signal sequence lies temporally or spatially between the pixels of the two successive and adjacent signal values of the first signal sequence, or vice versa, as illustrated in FIGS. 2A and 2B.

Referring to FIGS. 2A and 2B, individual pixels of fields A and B, respectively, of FIGS. 1A and 1B are illustrated in a randomly selected column k of both fields and in lines i−1, i, i+1, and i+2. Lines i−1 and i+1 are in field A of FIG. 2A, while lines i and i+2 are in field B of FIG. 2B. Image information values a(i−1) and a(i+1) are assigned to pixels P(k, i−1) and P(k, i+1) of field A, these pixels lying one below each other in column k in FIG. 2A. No image information value is assigned to a pixel P(k, i) lying between these pixels P(k, i−1) P(k, i+1) in field A. However, in field B an image information value b(i) is assigned to a pixel P(k, i). If one considers both a signal sequence a(k) generated by reading column k of field A and a signal sequence b(k) generated by reading the corresponding column k of field B, then one signal value of the signal sequence b(k) is temporally or spatially assigned to two successive signal values of the signal sequence a(k) such that the pixel belonging to the signal value of the signal sequence b(k) lies between the pixels of two successive and adjacent signal values of the signal sequence a(k). Conversely, one signal value of the signal sequence a(k) is accordingly assigned to two successive and adjacent signal values of the signal sequence b(k).

With reference to FIGS. 2A and 2B, the image information value b(i) of the signal sequence b(k) is assigned to the signal values a(i−1) and a(i+1) which are successive and adjacent in the signal sequence a(k). In this case, the signal sequence a(k) is referred to herein as the first signal sequence while the signal sequence b(k) is the second signal sequence. Further, the signal value a(i+1) of the signal sequence a(k) is assigned to the successive and adjacent signal values b(i) and b(i+2) of the signal sequence b(k). In this case, the signal sequence b(k) is referred to herein as the first signal sequence while the signal sequence a(k) is the second signal sequence. In video signals, for example, the signal values are luminance values or chrominance values.

In an exemplary embodiment of the method and device, a plurality of first spacing values are determined, each based on two successive and adjacent first and second signal values of the first signal sequence as one moves sequentially through the first sequence, and on the temporally or spatially assigned third signal value of the second signal sequence as one moves sequentially through the second sequence. The determined plurality of first spacing values are then linked (i.e., added) to determine the spacing between the two signal sequences.

The procedure for determining the first spacing values is explained below with reference to FIGS. 3A and 3B, where $a(i-1)$ is the first signal value, $a(i+1)$ is the second signal value, and $b(i)$ is the third signal value.

In FIGS. 3A and 3B, these signal values are plotted upward on a scale for two different scenarios, where in the first case the third signal value $b(i)$ lies outside an interval defined by the first and second signal values $a(i-1)$, $a(i+1)$ (FIG. 3A) and in the second case lies inside that interval (FIG. 3B).

To determine the first spacing value, a mixing value $a(i)$ is first generated from the first and second signal values $a(i-1)$ and $a(i+1)$, which mixing value may correspond to the mean value of these two signal values $a(i-1)$, $a(i+1)$, as expressed by:

$$a(i)=0.5 \cdot [a(i-1)+a(i+1)]$$

The first and second signal values $a(i-1)$, $a(i+1)$ define an interval for which an interval width value $m(i)$ is determined that may correspond to half the interval width, as expressed by:

$$m(i)=0.5 \cdot |a(i-1)-a(i+1)|$$

In addition, a second spacing value $d(i)$ is determined from the spacing or difference between the third signal value $b(i)$ and the mixing value $a(i)$, as expressed by:

$$d(i)=|b(i)-a(i)|$$

This second spacing value $d(i)$ is mapped onto the first spacing value using the interval width value $m(i)$ as the parameter such that a mapping curve, by which the second spacing value $d(i)$ is mapped onto the first spacing value, has at least two segments with different slopes, whereby the slope of the mapping curve, at least in segments, is shallower for second spacing values $d(i)$ smaller than the interval width value $m(i)$ than for second spacing values $d(i)$ larger than the interval width value $m(i)$; and such that for at least one second spacing value $d(i)$ smaller than the interval width value $m(i)$, the assigned first spacing value is smaller than this second spacing value.

FIG. 4 illustrates examples of curves f2, f3, f4, of three such mappings of the second spacing value $d(i)$ onto the first spacing value $dbd(i)$ which meet the requirements described above with respect to FIGS. 3A and 3B. The broken curve f1 illustrates a linear mapping of second spacing value $d(i)$ onto first spacing value $dbd(i)$.

The mapping illustrated by curve f2 satisfies the relationship:

$$dbd(i)=0 \text{ for } d(i)<c1 \cdot m(i),$$

$$dbd(i)=g1 \cdot (d(i)-c1 \cdot m(i)) \text{ for } d(i) \geq c1 \cdot m(i),$$

where $dbd(i)$ is the first spacing value, $d(i)$ is the second spacing value, c1 is a constant greater than zero which when multiplied by $m(i)$ creates a weighted interval width value, and g1 is a constant greater than zero which determines the slope of the curve.

This curve f2 represents a coring characteristic by which second spacing values $d(i)$ smaller than the weighted interval width value $c1 \cdot m(i)$ are set to zero, while for second spacing values greater than the weighted interval width value $c1 \cdot m(i)$ the first spacing value $dbd(i)$ is determined by multiplying the spacing or difference between second spacing value $d(i)$ and the weighted interval width value $c1 \cdot m(i)$ by the factor g1. The weighting factor c1 of interval width value $m(i)$ may be less than 1.

If c1 is less than 1 and the second spacing value $d(i)$ is less than the weighted interval width value $c1 \cdot m(i)$, then the third signal value $b(i)$ lies within the interval defined by the first and second signal values $a(i-1)$, $a(i+1)$. The first spacing value $dbd(i)$ is then set to zero since it is assumed that the deviation of the third signal value $b(i)$ from the interval center $a(i)$ represented by the mixing value results from the temporal or spatial offset of the third signal value $b(i)$ relative to the first and second signal values $a(i-1)$, $a(i+1)$.

FIG. 4 illustrates another mapping curve f3, which satisfies the relationship:

$$dbd(i)=0 \text{ for } d(i)<c1 \cdot m(i),$$

$$dbd(i)=g1 \cdot (d(i)-c1 \cdot m(i)) \text{ for } c1 \cdot m(i) \leq d(i) \leq c2 \cdot m(i),$$

$$dbd(i)=g2 \cdot (d(i)-c2 \cdot m(i))+g1 \cdot m(i) \cdot (c2-c1) \text{ for } c2 \cdot m(i) <d(i),$$

where c2>c1 and g2>g1, and where c1 may be less than 1. The term g2 is the slope of this curve f3 in the above segment.

These equations define a mapping curve having three segments with different slopes, where the second spacing value $d(i)$ is mapped onto a first spacing value $dbd(i)$ from zero as long as the second spacing value $d(i)$ is less than the weighted interval width value $c1 \cdot m(i)$. For the second spacing values $d(i)$ greater than the weighted interval width value $c1 \cdot m(i)$, the spacing between the second spacing value $d(i)$ and the weighted interval width value $c1 \cdot m(i)$ is mapped using a weighting factor g1 onto first spacing value $dbd(i)$ to generate first spacing value $dbd(i)$. The slope g1 of this segment is shallower than the slope g2 of a subsequent segment by which the second spacing values $d(i)$ greater than a second weighted interval width value $c2 \cdot m(i)$ are mapped onto the first spacing value $dbd(i)$.

Curve f4 illustrates another mapping curve which satisfies the relationship:

$$dbd(i)=1/m(i) \cdot c3 \cdot (d(i))^2 \text{ for } m(i) \neq 0,$$

where c3 is a constant greater than zero which for the curve f4 is equal to 1.

When the interval width value is equal to zero, the second spacing value $d(i)$, for example, is linearly mapped onto the first spacing value according to the expression $dbd(i)=g3 \cdot d(i)$.

A common property of all three curves f2, f3, f4 is that they have segments with different slopes, wherein smaller values for the second spacing value $d(i)$, specifically, those second spacing values $d(i)$ smaller than interval width value $m(i)$, are weighted more strongly for the generation of the first spacing value $dbd(i)$ than are the larger second spacing values $d(i)$, specifically, those second spacing values $d(i)$ greater than the interval width value $m(i)$. Another common feature is that for the second spacing values $d(i)$ smaller than the interval width value $m(i)$ the associated first spacing values $dbd(i)$ are smaller than the second spacing values $d(i)$.

FIG. 5 illustrates a first embodiment of a device for determining a spacing between the first and second signal sequences $a(k)$, $b(k)$, as discussed above with respect to the method. The device has a sampling device 10 which outputs two successive first and second signal values $a(i-1)$, $a(i+1)$ of the first signal sequence a(k) provided at the input. The second signal sequence b(k) is supplied to a second sampling device 40 which outputs the third signal value b(i) that is spatially or temporally assigned to the first and second signal values a(i−1), a(i+1) of the first signal sequence a(k).

Assuming that the first and second signal sequences a(k), b(k) are clocked signals, the values of the clocked signals being synchronized with a first clock signal, the first sampling device 10 has appropriate delay elements to provide the signals a(i−1) and a(i+1) isochronally with the signal b(i) to the second sampling device 40.

In addition, the device has a first spacing determination device 20 to which the first and second signal values a(i−1), a(i+1) are supplied, and which provides an interval width value m(i) which may correspond to the value of half the interval width of the interval defined by the first and second signal values a(i−1), a(i+1).

The device includes a mixer 30 to which the first and second signal values a(i−1), a(i+1) are supplied, and which provides a mixing value a(i) which may correspond to the mean value of first and second signal values a(i−1), a(i+1).

The device also includes a second spacing determination device 50 to which the mixing value a(i) and the third signal value b(i) are supplied, and which provides a second spacing value d(i) which may correspond to the value of the difference between the third signal value b(i) and the mixing value a(i). The interval width value m(i) and the second spacing value d(i) are supplied to a mapping unit 60 which maps the second spacing value d(i) onto the first spacing value dbd(i) using the interval width value m(i) as explained above in conjunction with the method. The mapping unit 60 may be implemented, for example, as a lookup table in which, based on the curves illustrated in FIG. 4, for each second spacing value d(i) an associated first spacing value dbd(i) is stored taking into account the interval width value m(i). The first spacing value dbd(i) is output from the mapping unit 60. The mapping unit 60 is followed by a summing unit 70 which adds together all of the resulting plurality of the first spacing values dbd(i) to generate a total spacing value, dbd, which represents the spacing between the first and second signal sequences a(k), b(k).

Figure 6:
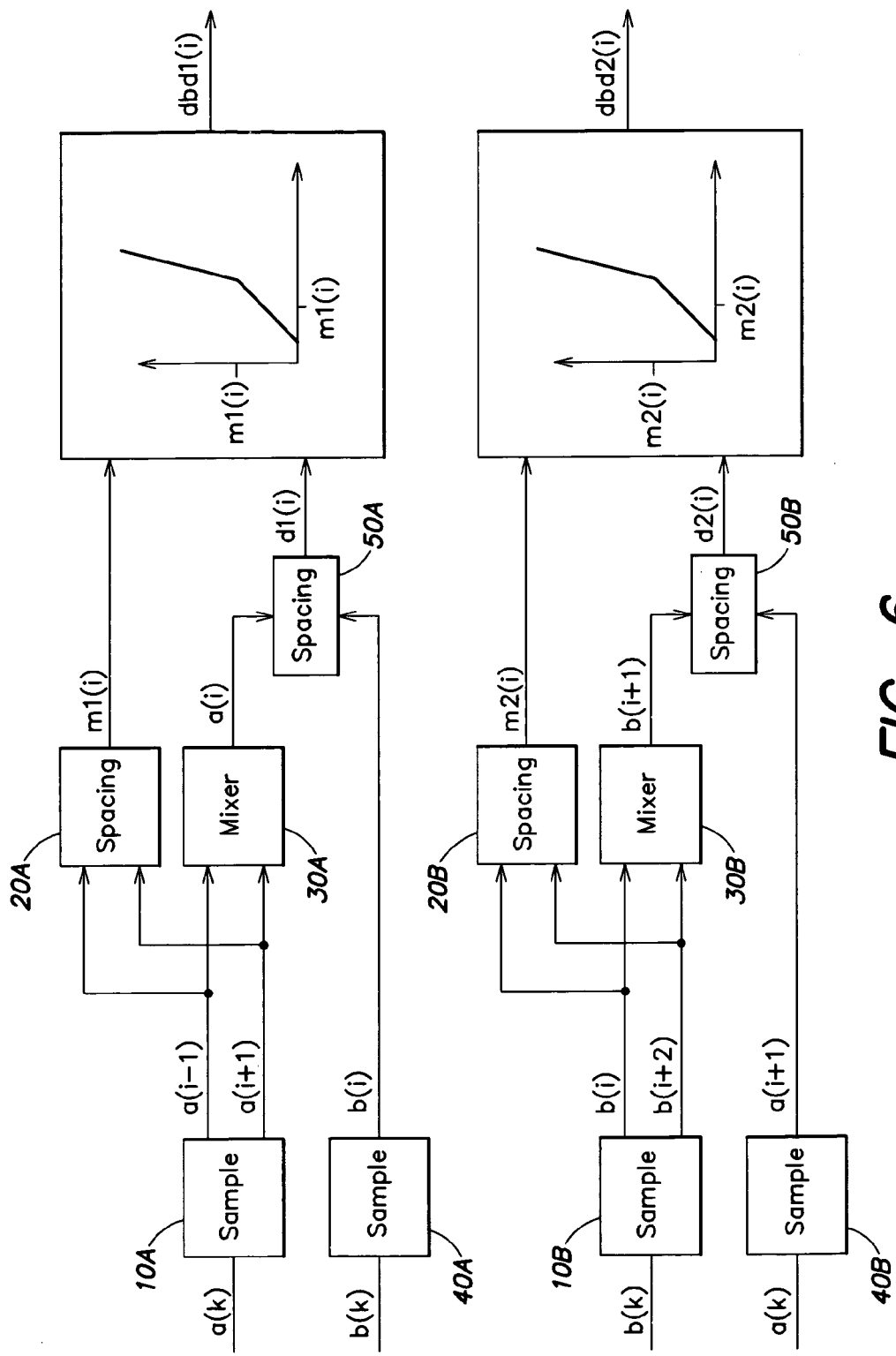
FIG. 6 is a block diagram of a second embodiment of a device for determining a spacing between a first signal sequence and a second signal sequence.

Referring to the alternative embodiment of FIG. 6, the device has two signal-processing branches with components similar to the device of FIG. 5, the individual components of FIG. 6 being identified analogously to the components in FIG. 5 with the addition of the letters A or B. In FIG. 6, the first signal-processing branch, which includes sampling devices 10A, 40A, interval width determination unit 20A, mixer 30A, and spacing determination unit 50A, determines one first spacing value dbd1(i) each from the successive and adjacent first and second signal values a(i−1), a(i+1) of first signal sequence a(k), where m1(i) identifies the interval width values associated with the first and second signal values a(i−1), a(i+1). The term d1(i) in the first signal-processing branch identifies the difference between the mixing value a(i) and the third signal value b(i) of the signal sequence b(k).

The second processing branch provides a second first spacing value dbd2(i) from two adjacent first and second signal values b(i), b(i+2) of the second signal sequence b(k), and from the third signal value a(i+1) of the first signal sequence a(k). The term m2(i) at the output of interval determination unit 20B represents the interval width value dependent on the first and second signal values b(i), b(i+2). The term b(i+1) at the output of mixing unit 30B represents a mixing value dependent on the first and second signal values b(i), b(i+2), while d2(i) at the output of spacing determination unit 50B identifies the value of the spacing between the mixing value b(i+1) and the third signal value a(i+1).

The components 10A, 40A, 10B, 40B of the two signal-processing branches are matched to each other such that they simultaneously output, synchronously with a clock signal, two successive signal values each of one of the signal sequences and the respective assigned signal values of the other signal sequence. The first spacing values dbd1(i), dbd2(i) available at the outputs of the mapping units 60A, 60B, respectively, are added to generate the first spacing value dbd(i) which is dependent on four signal values, specifically, two adjacent signal values of the first signal sequence a(k) and two adjacent signal values of the second signal sequence b(k), wherein one of the two adjacent signal values of the second signal sequence is temporally or spatially assigned to the two adjacent signal values of the first signal sequence. As with the device of FIG. 5, the first spacing value dbd(i) output from the device of FIG. 6 represents the spacing between the first and second signal sequences a(k) and b(k).

Although the present invention has been shown and described with respect to several preferred embodiments thereof, various changes, omissions and additions to the form and detail thereof, may be made therein, without departing from the spirit and scope of the invention.

What is claimed is:

1. A method for determining a spacing between a first sequence of signal values and a second sequence of signal values, wherein a third signal value of the second sequence is assigned to a first signal value and a second signal value each of the first sequence, the first and second signal values of the first sequence being disposed in succession in the first sequence, the third signal value lying temporally or spatially between the first and second signal values, wherein the method determines the spacing between the first and second sequences by determining at least one first spacing value therebetween based on the following steps:
   a) determining a mixing value from the first and second signal values by weighting these signal values;
   b) determining a mathematical spacing between the mixing value and the third signal value to determine a second spacing;
   c) determining an interval width value dependent on the interval width of an interval defined by the first and second signal values;
   d) mapping the second spacing value onto the first spacing value using the interval width value as a mapping parameter such that a mapping curve by which the second spacing value is mapped onto the first spacing value has at least two segments with different slopes, where the slope of the curve, at least in segments, is shallower for the second spacing values smaller than the interval width value than for the second spacing values larger than the interval width value; and
   such that for at least one second spacing value smaller than the interval width value, the determined first spacing value is smaller than the second spacing value.

2. The method of claim 1, wherein the interval width value corresponds to half the interval width of the interval defined by the first and second signal values.

3. The method of claim 1, wherein the mixing value is the mean value of the first and second signal values.

4. The method of claim 1, where the mapping curve satisfies the following relationship:

$dbd(i)=0$ for $d(i)<c1 \cdot m(i)$, $dbd(i)=g1 \cdot (d(i)-c1 \cdot m(i))$ for $d(i) \geq c1 \cdot m(i)$, where
dbd(i) is the first spacing value,
d(i) is the second spacing value,
m(i) is the interval width value,
c1 is a constant greater than zero, and
g1 is a constant greater than zero.

5. The method of claim 4, where c1<1.

6. The method of claim 1, where the mapping curve satisfies the following relationship:

$dbd(i)=0$ for $d(i)<c1 \cdot m(i)$, $dbd(i)=g1 \cdot (d(i)-c1 \cdot m(i))$ for $c1 \cdot m(i) \leq d(i) \leq c2 \cdot m(i)$, $dbd(i)=g2 \cdot (d(i)-c2 \cdot m(i))+g1 \cdot m(i) \cdot (c2-c1)$ for $c2 \cdot m(i) < d(i)$, where
−c2>c1 and g2>g1, and
dbd(i) is the first spacing value,
d(i) is the second spacing value,
m(i) is the interval width value,
c1 is a constant greater than zero,
c2 is a constant greater than zero,
g1 is a constant greater than zero, and
g2 is a constant greater than zero.

7. The method of claim 1, wherein the mapping curve satisfies the following relationship:

$dbd(i)=1/m(i) \cdot c3 \cdot (d(i))^2$ for $m(i) \neq 0$, where
dbd(i) is the first spacing value,
d(i) is the second spacing value,
m(i) is the interval width value, and
c3 is a constant greater than zero.

8. The method of claim 7, wherein the mapping curve for m(i)=0 satisfies the following relationship:

$dbd(i)=g3 \cdot d(i)$ where g3 is a constant.

9. The method of claim 7, where a plurality of first spacing values are determined based on a plurality of signal values of the first and second signal sequences, and where the plurality of first spacing values are linked to determine the spacing between the first and second signal sequences.

10. The method of claim 9, where the plurality of first spacing values are added to determine the spacing between the first and second sequences.

11. A device for determining a spacing between a first sequence of signal values and a second sequence of signal values, comprising:
a mixer to generate a mixing value from a first signal value and a second signal value, which follow in succession in the first signal sequence, by weighting these first and second signal values;
a spacing determination unit to which are supplied the mixing value and a third signal value of the second sequence, the third value lying temporally or spatially between the first and second signal values, the spacing determination unit determining a mathematical spacing between the mixing value and the third signal value, to determine a second spacing value;
an interval determination unit, which determines an interval width of defined by the first and second signal values and provides an interval width value therefrom;
a mapping unit, which provides a first spacing value wherein the mapping unit maps the second spacing value onto the first spacing value using the interval width value as the parameter such that a mapping curve by which the second spacing value is mapped onto the first spacing value has at least two segments with different slopes, where the slope of the curve, at least in segments, is shallower for second spacing values smaller than the interval width value than for the second spacing values larger than the interval value width; and
such that for at least one second spacing value smaller than the interval width value, the determine first spacing value is smaller than the second spacing value.

12. The device of claim 11, wherein the interval width value corresponds to half the interval width of the interval defined by the first and second signal values.

13. The device of claim 11, where the mixing value is the mean value of the first and second signal values.

14. The device of claim 11, where the mapping curve satisfies the following relationship:

$dbd(i)=0$ for $d(i)<c1 \cdot m(i)$, $dbd(i)=d1 \cdot (d(i)-c1 \cdot m(i))$ for $d(i) \geq c1 \cdot m(i)$, where
dbd(i) is the first spacing value,
d(i) is the second spacing value,
m(i) is the interval width value,
c1 is a constant greater than zero, and
g1 is a constant greater than zero.

15. The device of claim 14, where c1<0.

16. The device of claim 11, wherein the mapping curve satisfies the following relationship:

$dbd(i)=0$ for $d(i)<c1 \cdot m(i)$, $dbd(i)=g1 \cdot (d(i)-c1 \cdot m(i))$ for $c1 \cdot m(i) \leq d(i) \leq c2 \cdot m(i)$, $dbd(i)=g2 \cdot (d(i)-c2 \cdot m(i))+g1 \cdot m(i) \cdot (c2-c1)$ for $c2 \cdot m(i) < d(i)$, where c2> c1 and g2> g1, and
dbd(i) is the first spacing value,
d(i) is the second spacing value,
m(i) is the interval width value,
c1 is a constant greater than zero,
c2 is a constant greater than zero,
g1 is a constant greater than zero, and
g2 is a constant greater than zero.

17. The device of claim 11, wherein the mapping curve satisfies the following relationship:

$dbd(i)=1/m(i) \cdot c3 \cdot (d(i))^2$ for $m(i) \neq 0$, where
dbd(i) is the first spacing value,
d(i) is the second spacing value, and
m(i) is the interval width value.

18. The device of claim 17, where the mapping curve for m(i)=0 satisfies the relationship:

$dbd(i)=g \cdot d(i)$ where g is a constant.

19. A method for determining a spacing between a first sequence of signal values and a second sequence of signal values, first and second successive and adjacent signal values of the first sequence have assigned thereto a third signal value of the second sequence which is located between the first and second signal values of the first sequence, comprising the steps of:
- a) determining a mixing value from the first and second signal values;
- b) determining a second spacing value from a spacing between the mixing value and the third signal value;
- c) determining an interval width value from a width of an interval defined by the first and second signal values; and
- d) determining a plurality of first spacing values, each first spacing value being determined by mapping the second spacing value onto the first spacing value using the interval width value as a mapping parameter such that a mapping curve by which the second spacing value is mapped onto the first spacing value has at least two segments with different slopes, where the slope of the curve, at least in segments, is shallower for the second spacing values smaller than the interval width value than for the second spacing values larger than the interval width value; and such that for at least one second spacing value smaller than the interval width value, the determined first spacing value is smaller than the second spacing value.

20. The method of claim 19, where the plurality of first spacing values are determined based on a plurality of signal values of the first and second signal sequences, and where the plurality of first spacing values are added to determine the spacing between the first and second signal sequences.

* * * * *

UNITED STATES PATENT AND TRADEMARK OFFICE
CERTIFICATE OF CORRECTION

PATENT NO.         : 7,145,604 B2
APPLICATION NO.    : 10/832475
DATED              : December 5, 2006
INVENTOR(S)        : Hahn et al.

It is certified that error appears in the above-identified patent and that said Letters Patent is hereby corrected as shown below:

Column 8
In the claims, claim 1, line 46, after "spacing" insert --value--
In the claims, claim 2, line 63, delete "wherein" and insert --where--
In the claims, claim 3, line 66, delete "wherein" and insert --where--

Column 9
In the claims, claim 7, line 32, delete "wherein" and insert --where--
In the claims, claim 8, line 41, delete "wherein" and insert --where--
In the claims, claim 11, line 60, after "weighting" delete "these" and insert --the--

Column 10
In the claims, claim 11, line 1, before "an interval" insert --a width of--
In the claims, claim 11, line 2, after "interval" delete "width of"
In the claims, claim 12, line 18, delete "wherein" and insert --where--
In the claims, claim 16, line 36, delete "wherein" and insert --where--
In the claims, claim 17, line 52, delete "wherein" and insert --where--

Signed and Sealed this

Twentieth Day of February, 2007

JON W. DUDAS
*Director of the United States Patent and Trademark Office*